United States Patent [19]

Funke

[11] Patent Number: 5,699,721
[45] Date of Patent: Dec. 23, 1997

[54] EGG COOKER

[75] Inventor: Peter Funke, Sundern, Germany

[73] Assignee: Gebruder Funke KG, Sundern, Germany

[21] Appl. No.: 786,093

[22] Filed: Jan. 17, 1997

[30] Foreign Application Priority Data

Feb. 23, 1996 [DE] Germany ............ 296 03 112.7

[51] Int. Cl.[6] ............................................. A47J 29/02
[52] U.S. Cl. ................ 99/336; 99/344; 99/440
[58] Field of Search ................. 99/341–336, 357, 99/330, 440, 410, 485, 516, 646 R; 126/392, 388, 374; 219/439, 405, 461; 392/432

[56] References Cited

U.S. PATENT DOCUMENTS

| | | | |
|---|---|---|---|
| 1,921,036 | 8/1933 | Matthews | 99/336 |
| 2,562,991 | 8/1951 | Rothschild | 99/440 X |
| 2,790,378 | 4/1957 | Zander | 99/336 |
| 3,690,246 | 9/1972 | Guthrie, Sr. | 99/336 |
| 3,759,163 | 9/1973 | Walker | 99/344 X |
| 3,859,981 | 1/1975 | Oshida | 99/440 X |
| 4,133,996 | 1/1979 | Fread | 99/440 X |
| 4,261,328 | 4/1981 | Kirk | 126/392 |
| 4,280,032 | 7/1981 | Levinson | 99/336 |
| 5,619,906 | 4/1997 | Ishida | 99/344 X |

*Primary Examiner*—Timothy F. Simone
*Attorney, Agent, or Firm*—Herbert Dubno; Andrew Wilford

[57] ABSTRACT

An egg cooker has a holder forming at least one egg seat and adapted to be set in a body of water with an egg in the seat at least partially below a level of the water. A temperature sensor on the body detects a temperature of the body of water and an acoustic emitter on the body can emit an audible signal. A circuit including a timer and connected to the sensor and emitter starts the timer when the sensor detects a predetermined elevated water temperature and emits a first audible signal at a predetermined interval after the timer is started and a second audible signal different from the first signal at a predetermined interval after the first signal.

11 Claims, 3 Drawing Sheets

EGG COOKER

FIELD OF THE INVENTION

The present invention relates to an egg cooker. More particularly this invention concerns a device which is loaded with a plurality of eggs and set in a body of water that is then heated to cook the eggs.

BACKGROUND OF THE INVENTION

In order to cook an egg to a desired degree of doneness it is obviously necessary to heat its interior to a certain temperature. Since the cooking is normally done in a water bath that is boiling and, therefore, at 100° C., the amount of time necessary to achieve a predetermined degree of doneness is determined both by the starting temperature of the egg and of the water.

It is normally considered best, mainly to avoid cracking the egg, to start with a cold or room-temperature egg in a bath of cold or room-temperature water. One must monitor either the overall cooking time or, for more accurate results, the time starting from when the water begins to boil to determine the doneness. An experienced cook can get reproducible results with a modest amount of experimentation provided that he or she monitors the process fairly closely. Normally, however, a busy person settles for soft-boiled eggs that are too soft Or too hard or hard-boiled eggs that are too soft or dry and sulfur-blackened as keeping accurate track of the egg-cooking process is just too troublesome.

OBJECTS OF THE INVENTION

It is therefore an object of the present invention to provide an improved egg cooker.

Another object is the provision of such an improved egg cooker which overcomes the above-given disadvantages, that is which allows eggs to be cooked to an exactly controlled degree of doneness without requiring the cook to closely monitor the cooking process.

SUMMARY OF THE INVENTION

An egg cooker has according to the invention a holder forming at least one egg seat and adapted to be set in a body of water with an egg in the seat at least partially below a level of the water. A temperature sensor on the body detects a temperature of the body of water and an acoustic emitter on the body can emit an audible signal. A circuit including a timer and connected to the sensor and emitter starts the timer when the sensor detects a predetermined elevated water temperature and emits a first audible signal at a predetermined interval after the timer is started and a second audible signal different from the first signal at a predetermined interval after the first signal.

Thus all the user need do is load the holder with eggs, set it in the body of water, and turn on the heat. When the water body reaches a temperature of say 85° C. or 100° C. the timer is started. Once the first interval, say four minutes, has elapsed, the first signal is emitted, and then further signals are subsequently emitted if the holder is left in the water. The cook need merely know which signal corresponds to the desired state of doneness and remove the eggs from the water when this signal is emitted. The entire problem of monitoring the pot to see when the water starts boiling is eliminated so that near perfect results can be achieved every time. The same device can be used to prepare soft- and hard-boiled eggs.

According to a feature of the invention the holder is formed as a cage having a lower region forming the seat and an upper part normally above the body of water holding the sensor, emitter, and circuit means. The housing forms an upwardly and horizontally closed but downwardly open chamber above the body of water. The sensor is in the chamber.

A battery is provided on the holder along with a switch connected between the battery and the circuit for in a closed position powering the circuit from the battery. The holder has a cap defining a hermetically closed compartment holding the battery. This cap can be is displaceable without removal on the holder and engageable with the switch for operating same.

In another arrangement the holder has an extension projecting when the holder is sitting in the body of water below a level of the water and carrying the sensor for positioning same in the body of water when the holder is sitting in the body of water. This extension also can carry a pair of spaced-apart contacts forming the switch means so that when the holder is sitting in the body of water with the contacts short circuited by the water the switch means is in the closed position.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
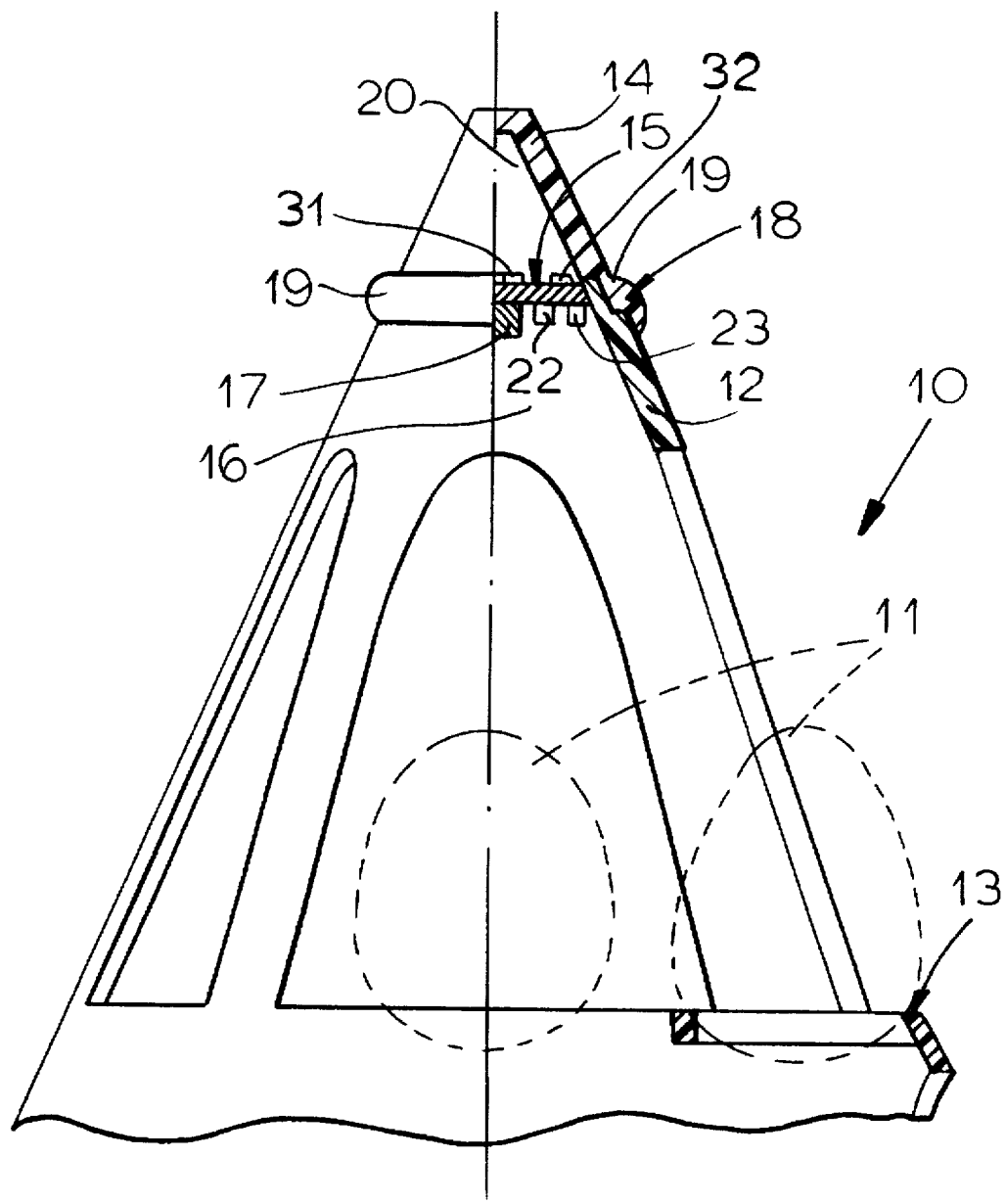
FIG. 1 is a side view partly in vertical section through an egg cooker according to the invention.
Figure 2:
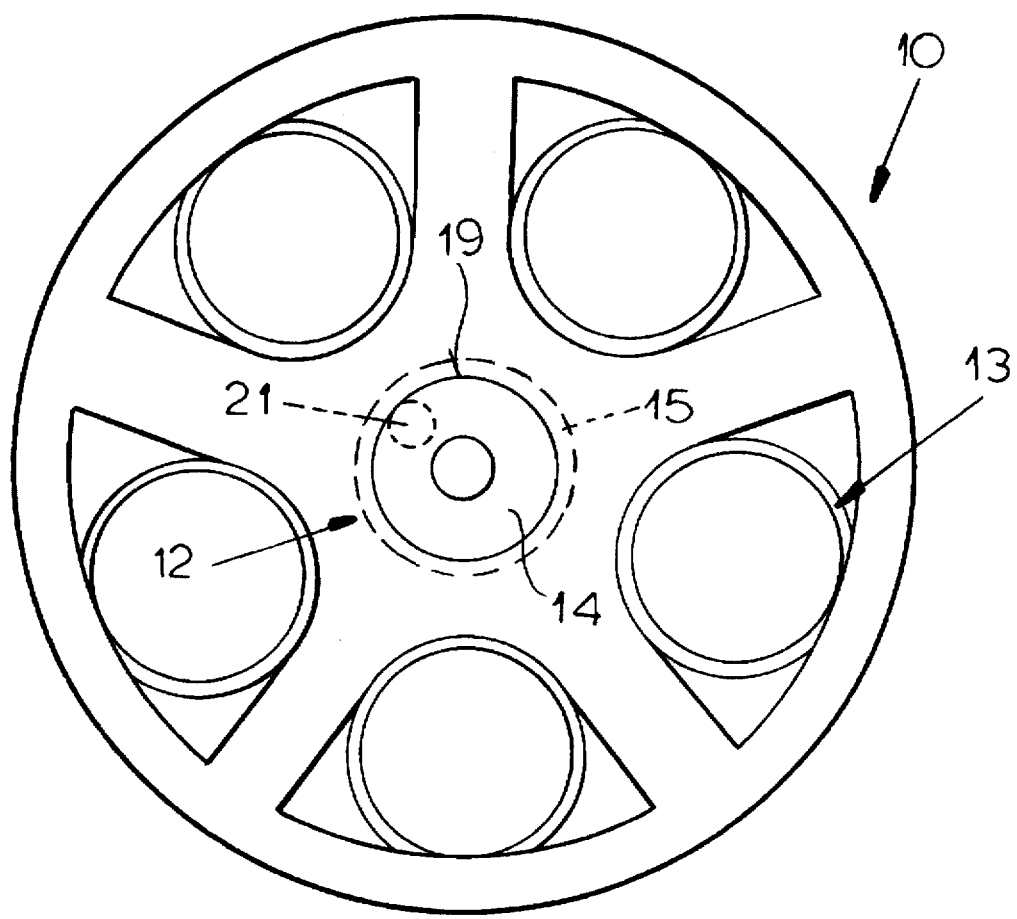
FIG. 2 is a bottom view of the cooker of FIG. 1.

As seen in FIGS. 1 and 2 an egg cooker 10 according to this invention has a cage-like lower housing part 12 of frustoconical shape and formed with five seats 13 for eggs 11 and a generally conical upper housing part 14. Both parts 12 and 14 are made of a heat-resistant synthetic resin. The lower part 12 has an upper wall 15 defining a horizontally and upwardly closed but downwardly open steam-catching chamber 16. The upper part 14 is formed like a cap defining a closed compartment 20 and has a lower edge or collar 19 that fits snugly around the upper end of the lower part 12 and is secured thereto by a bayonet coupling 18 so the compartment 20 is hermetically closed.

The wall 15 carries on its lower face an NTC temperature sensor 17 connected to a circuit 22 having a piezoelectric adder acting as a timer 23. On its upper face it is formed with a battery holder 21 and carries a switch 32 operable by rotation of the cap 14 and a small acoustic emitter or beeper 31 connected to the circuit 22. The parts 17, 22, and 23 are potted so that they are protected against steam in the chamber 16 and the fit of the cap 14 on the base part 12 is so tight that the device can be washed in water without fear of ruining elements in the compartment 20.

This device is used as follows:

The cook loads up to five eggs 11 into the seats 13 and turns the device 10 on by rotating the cap 14 enough to actuate the switch 14 without undoing the bayonet coupling 18. The turned-on and loaded device 10 into a pot of water deep enough to substantially cover the eggs 11 and the heat is turned on under the pot.

Once the water starts to boil the chamber 16 will be filled with steam and the temperature sensor 17 will detect this elevated temperature and start the timer 23, typically also emitting at that time a single beep to indicate to the cook that the water is boiling. After a predetermined number of minutes, normally four or five, another different signal is emitted, for instance three beeps, indicating that the eggs are at the soft-cooked stage. When six to seven minutes have elapsed since boiling started yet another signal, for instance five beeps, is emitted, to indicate a harder-cooked soft-boiled egg. After about ten minutes the beeper 31 emits a continuous tone to indicate that the eggs are hard-cooked.

Figure 4:
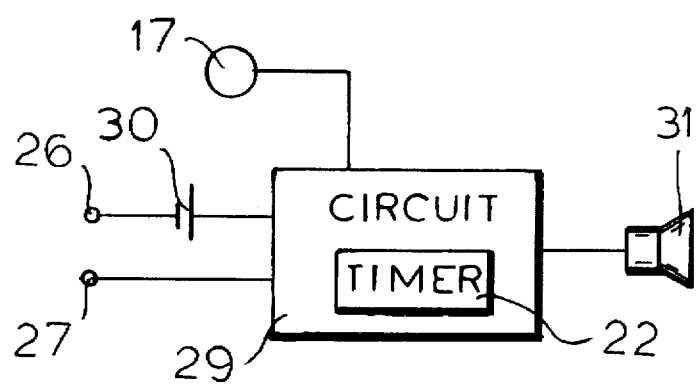
FIG. 4 is a schematic diagram illustrating operation of the FIG. 3 cooker.
Figure 3:
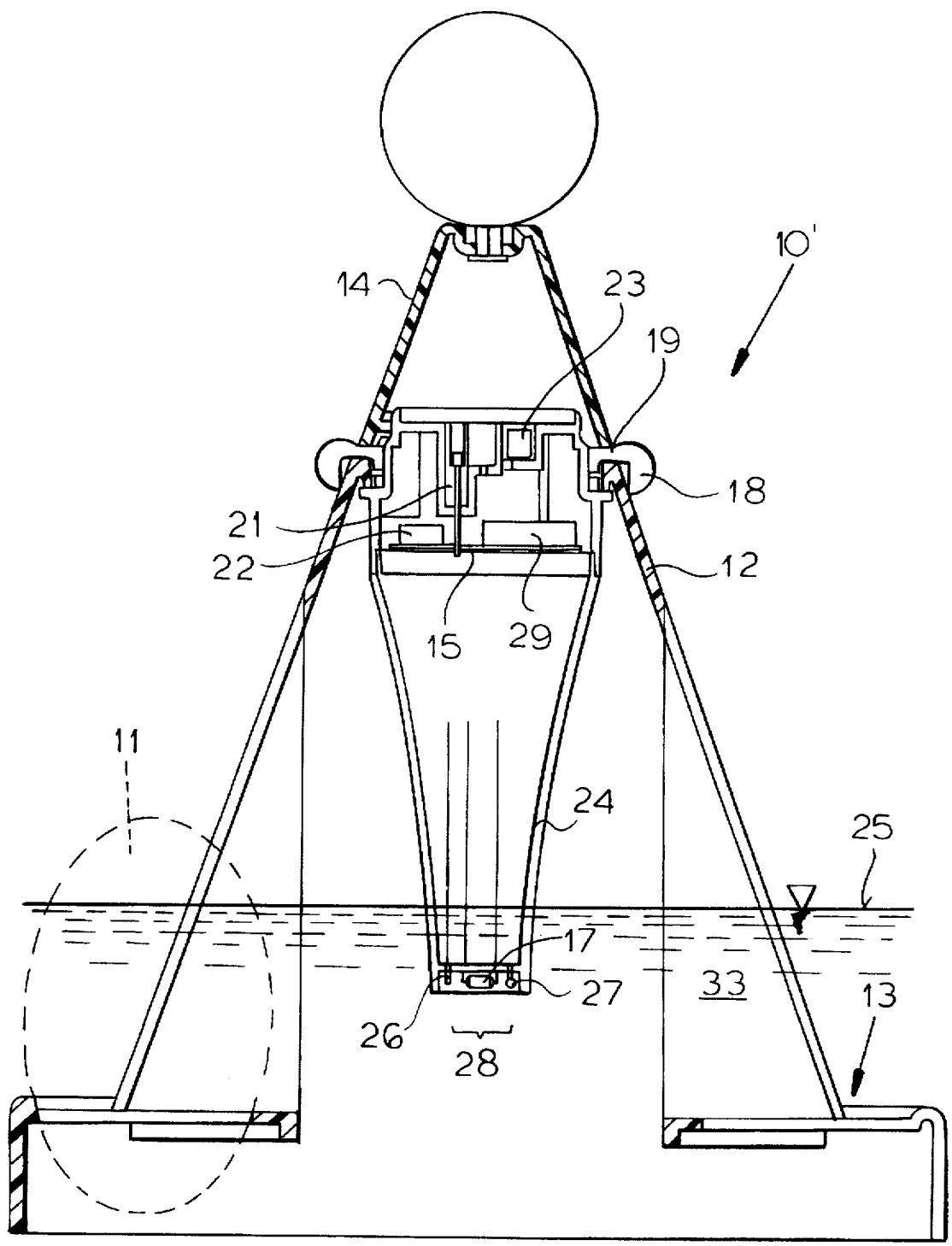
FIG. 3 is a vertical section through another cooker according to the invention.

The arrangement of FIGS. 3 and 4 is similar to that of FIGS. 1 and 2 and identical reference numerals are applied to functionally identical structure. Here the lower part 12 carries a central downward extension 24 that carries on its lower end the temperature sensor 17 and two contacts 26 and 27 that together form a switch 28 replacing the switch 32. The contact 26 is connected to a battery 30 in turn connected to a circuit 29 itself connected to the sensor 17, to the beeper 31, and incorporating the timer 22 and the contact 27 is connected directly to the circuit 29. The extension 24 is so dimensioned that when the device 10' is set in a body of water 33 the sensor 17 and contacts 26 and 27 will be below a level 25 of the water 33.

This arrangement is used like that of FIGS. 1 and 2 except that it turns on automatically when the contacts 26 and 27 are immersed in the body 33 of water, which is normally salted and highly conductive. The timer 22 is started when the sensor 17 detects a temperature of about 85° C. which is achieved slightly before the water reaches a full boil, but otherwise the system operates identically to that of FIGS. 1 and 2. It is automatically turned off when lifted out of the body 33 of water, open-circuiting the switch 28.

I claim:

1. An egg cooker comprising:

a holder forming at least one egg seat and adapted to be set in a body of water with an egg in the seat at least partially below a level of the water;

a temperature sensor on the body for detecting a temperature of the body of water;

an acoustic emitter on the body capable of emitting an audible signal; and circuit means including a timer and connected to the sensor and emitter for starting the timer when the sensor detects a predetermined elevated water temperature and for emitting a first audible signal at a predetermined interval after the timer is started and a second audible signal different from the first signal at a predetermined interval after the first signal.

2. The egg cooker defined in claim 1 wherein the holder is formed as a cage having a lower region forming the seat and an upper part normally above the body of water holding the sensor, emitter, and circuit means.

3. The egg cooker defined in claim 1 wherein the housing forms an upwardly and horizontally closed but downwardly open chamber above the body of water, the sensor being in the chamber.

4. The egg cooker defined in claim 1, further comprising:

a battery on the holder; and switch means connected between the battery and the circuit for in a closed position powering the circuit means from the battery.

5. The egg cooker defined in claim 4 wherein the holder has a cap defining a hermetically closed compartment holding the battery.

6. The egg cooker defined in claim 5 wherein the cap is displaceable without removal on the holder and is engageable with the switch for operating same.

7. The egg cooker defined in claim 4 wherein the holder has an extension projecting when the holder is sitting in the body of water below a level of the water and carrying the sensor for positioning same in the body of water when the holder is sitting in the body of water.

8. The egg cooker defined in claim 4 wherein the holder has an extension projecting when the holder is sitting in the body of water below a level of the water and carrying a pair of spaced-apart contacts forming the switch means, whereby when the holder is sitting in the body of water with the contacts short circuited by the water the switch means is in the closed position.

9. The egg cooker defined in claim 8 wherein the extension also carries the sensor for positioning same in the body of water when the holder is sitting in the body of water.

10. The egg cooker defined in claim 1 wherein the timer is a piezoelectric adder.

11. The egg cooker defined in claim 1 wherein the holder is made of a heat-resistant synthetic resin and has a plurality of such seats.

* * * * *